(12) United States Patent
Chai et al.

(10) Patent No.: US 11,051,013 B2
(45) Date of Patent: Jun. 29, 2021

(54) DEVICE AND METHOD OF SELECTING AN INTRA MODE OF A CODING UNIT

(71) Applicant: Realtek Semiconductor Corp., HsinChu (TW)

(72) Inventors: Chi-Wang Chai, Cupertino, CA (US); Weimin Zeng, Milpitas, CA (US); Wujun Chen, Suzhou (CN); Jing Wang, Suzhou (CN); Wei Pu, Jiangsu (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/680,517

(22) Filed: Nov. 12, 2019

(65) Prior Publication Data
US 2021/0144368 A1 May 13, 2021

(51) Int. Cl.
| | | |
|---|---|---|
| *H04N 19/11* | (2014.01) | |
| *H04N 19/182* | (2014.01) | |
| *H04N 19/186* | (2014.01) | |
| *H04N 19/147* | (2014.01) | |

(52) U.S. Cl.
CPC ........... *H04N 19/11* (2014.11); *H04N 19/147* (2014.11); *H04N 19/182* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 7,804,900 B2* | 9/2010 | Jou | ...................... | H04N 19/436 |
| | | | | 375/240.18 |
| 10,003,792 B2* | 6/2018 | Peng | ..................... | H04N 19/136 |
| 10,440,390 B2* | 10/2019 | Shen | ...................... | H04N 19/14 |
| 10,630,981 B2* | 4/2020 | Kubota | ................ | H04N 19/159 |
| 10,652,581 B1* | 5/2020 | Bokov | ................... | H04N 19/11 |
| 2015/0016521 A1* | 1/2015 | Peng | ..................... | H04N 19/192 |
| | | | | 375/240.12 |
| 2017/0041605 A1* | 2/2017 | Watanabe | ............ | H04N 19/172 |
| 2017/0302962 A1* | 10/2017 | Shen | .................... | H04N 19/593 |
| 2020/0021817 A1* | 1/2020 | Van der Auwera | .......................... | |
| | | | | H04N 19/105 |

OTHER PUBLICATIONS

Sullivan, "Overview of the High Efficiency Video Coding (HEVC) Standard", IEEE, Dec. 2012.

\* cited by examiner

*Primary Examiner* — Chikaodili E Anyikire
(74) *Attorney, Agent, or Firm* — Winston Hsu (57) ABSTRACT

A selection module for selecting an intra mode comprises a histogram of oriented gradient (HOG) module, for receiving a coding unit (CU), to select four angular modes from 33 angular modes of the CU, a DC mode of the CU and a planar mode of the CU; and a decision module, couple to the HOG module, for receiving the six modes from the HOG module, to compare the six modes according to a Split Sum of Absolute Transformed Difference (SSATD) algorithm, to select one of the six modes.

14 Claims, 8 Drawing Sheets

DEVICE AND METHOD OF SELECTING AN INTRA MODE OF A CODING UNIT

BACKGROUND OF THE INVENTION

1. Field of the Invention

The present invention relates to a device and a method used in a multimedia system, and more particularly, to a device and a method of selecting an intra mode of a coding unit.

2. Description of the Prior Art

In a high efficiency video coding (HEVC) standard, there are 35 intra modes (i.e., intra prediction modes) of a luma component, including a planar mode, a DC mode and 33 angular modes. There are 5 intra modes of a chroma component, including a planar mode, a vertical mode, a horizontal mode, a DC mode and a prediction mode corresponding to the luma component. Comparing with 8 intra angular prediction modes in a H.264/MPEG-4 AVC standard, there are the 33 angular modes developed and extended in the HEVC standard.

According to statistical information, allocations of angular modes near horizontal/vertical directions are intensive, and allocations of angular modes near diagonal directions are sparse.

In a reference design of the HEVC standard, for each of the 35 intra modes, a transform, a quantization, an inverse quantization and an inverse transform are performed to obtain a predicted value of the intra mode. A difference between an original pixel and the predicted pixel is used for determining whether an intra mode is a best mode, and the best mode achieves the minimum rate distortion cost.

The abovementioned method achieves a better performance at cost of a high computation complexity. A block size supported in the HEVC standard ranges from 4×4 to 64×64. It is difficult to implement hardware realizing the HEVC standard, if the transform, the quantization, the inverse quantization and the inverse transform are performed on each of the 35 intra modes. Thus, a device and method of selecting an intra mode with a low complexity is needed.

SUMMARY OF THE INVENTION

The present invention therefore provides a device and a method for selecting an intra mode of a coding unit to solve the abovementioned problem.

A selection module for selecting an intra mode comprises a histogram of oriented gradient (HOG) module, for receiving a coding unit (CU), to select four angular modes from 33 angular modes of the CU, a DC mode of the CU and a planar mode of the CU; and a decision module, couple to the HOG module, for receiving the six modes from the HOG module, to compare the six modes according to a Split Sum of Absolute Transformed Difference (SSATD) algorithm, to select one of the six modes.

A method for selecting an intra mode comprises receiving a coding unit (CU), to select four angular modes from 33 angular modes of the CU, a DC mode of the CU and a planar mode of the CU; and receiving the six modes, to compare the six modes according to a Split Sum of Absolute Transformed Difference (SSATD) algorithm, to select one of the six modes.

These and other objectives of the present invention will no doubt become obvious to those of ordinary skill in the art after reading the following detailed description of the preferred embodiment that is illustrated in the various figures and drawings.

DETAILED DESCRIPTION

The present invention proposes a method of selecting an intra mode (i.e., intra prediction mode) of a coding unit (CU) to reduce computation complexity according to the following steps:

1. Selecting four angular modes from 33 angular modes of a luma component of the CU according to a histogram of oriented gradient (HOG) method.
2. Comparing the four angular modes, a DC mode of the luma component and a planar mode of the luma component, to select a best one of the six modes.
3. Setting an intra mode of a chroma component to a corresponding intra mode of the luma component.
4. Replacing a set of a plurality of reconstructed pixels of a plurality of reference pixels by a plurality of original pixels.

According to the above steps, parallel processing of hardware can be realized, and computation complexity of the hardware is reduced.

Figure 1:
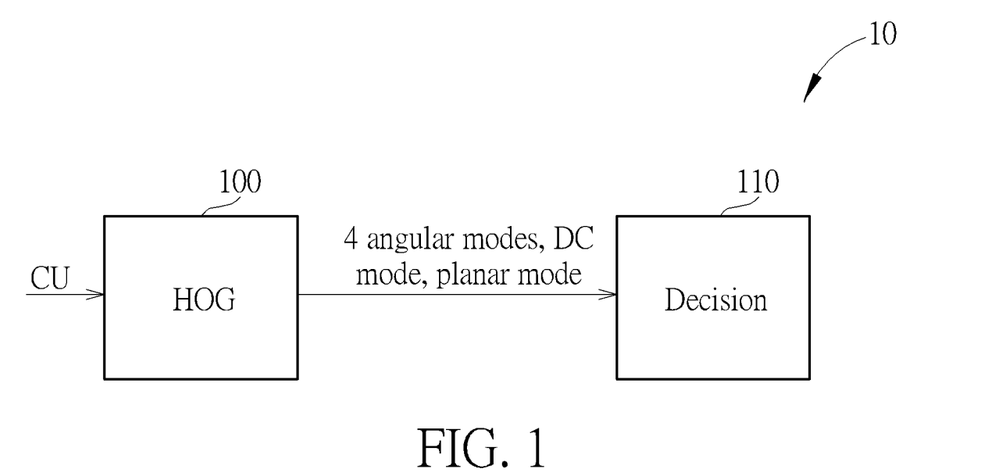
FIG. 1 is a schematic diagram of a selection module for selecting an intra mode according to an example of the present invention.

FIG. 1 is a schematic diagram of a selection module 10 for selecting an intra mode according to an example of the present invention. The selection module 10 includes a HOG module 100 and a decision module 110. A CU with a size of 32×32 is considered in the present example. The HOG module 100 selects 4 angular modes from 33 angular modes of the CU, a DC mode of the CU and a planar mode of the CU, after receiving the CU. The HOG module 100 provides the 4 angular modes, the DC mode and the planar mode to the decision module 110. The decision module 110 coupled to the HOG module 100 receives the 6 modes, and compares the 6 modes according to a Split Sum of Absolute Transformed Difference (SSATD) algorithm, to select one of the 6 modes with a highest performance (or a lowest distortion).

There are various realizations of the HOG module 100 and the decision module 110. Examples of operations of the HOG module 100 and the decision module 110 are described in the following paragraphs.

An input to the HOG module 100 includes pixels of a luma component. First, gradients of a current block are computed according to a Sobel operator, to obtain a HOG value of the current block. Edge directions are computed, and the edge directions are compared with directions of 33 angles in the HEVC standard. This process is called a direction partitioning.

1. Gradient Computation

A gradient operator at a X direction is defined as follows:

$$fltX\ Coeff[3][3]=\{\{-1,0,1\},\{-2,0,2\},\{-1,0,1\}\};\qquad (Eq.\ 1)$$

A gradient operator at a Y direction is defined as follows:

$$fltY\ Coeff[3][3]=\{\{-1,-2,-1\},\{0,0,0\},\{1,2,1\}\}.\qquad (Eq.\ 2)$$

For each pixel of the luma component, a gradient gx at the X direction and a gradient gy at the Y direction of a point are computed. For example, assuming that a position of a pixel is (row, col) and a luma image is termed as Img, the gradients at the X direction and the Y direction are computed, e.g., by the HOG module 100, as follows:

$$\begin{aligned}gx[row][col]=&fltX\ Coeff[0][0]*Img[row-1][col-1]+\\&fltX\ Coeff[0][1]*Img[row-1][col]+fltX\ Coeff[0]\\&[2]*Img[row-1][col+1]+fltX\ Coeff[1][0]*Img\\&[row][col-1]+fltX\ Coeff[1][1]*Img[row][col]+\\&fltX\ Coeff[1][2]*Img[row][col+1]+fltX\ Coeff[2]\\&[0]*Img[row+1][col-1]+fltX\ Coeff[2][1]*Img\\&[row+1][col]+fltX\ Coeff[2][2]*Img[row+1][col+\\&1],\qquad (Eq.3)\end{aligned}$$

$$\begin{aligned}gy[row][col]=&fltY\ Coeff[0][0]*Image[row-1][col-1]+\\&fltY\ Coeff[0][1]*Img[row-1][col]+fltY\ Coeff[0]\\&[2]*Img[row-1][col+1]+fltY\ Coeff[1][0]*Img\\&[row][col-1]+fltY\ Coeff[1][1]*Img[row][col]+\\&fltY\ Coeff[1][2]*Img[row][col+1]+fltY\ Coeff[2]\\&[0]*Img[row+1][col-1]+fltY\ Coeff[2][1]*Img\\&[row+1][col]+fltY\ Coeff[2][2]*Img[row+1][col+\\&1].\qquad (Eq.\ 4)\end{aligned}$$

Pixels outside a coding tree unit (CTU) are needed for computing pixels at edges of the CU. Thus, the CU is extended as follows.

$$\begin{aligned}&Block[row][col]=Block[0][0],\ if\ row<0,col<0,//upper\\&\quad left\ Block[0][maxCol],\ if\ row<0,col>maxCol,//\\&\quad upper\ right\ Block[maxRow][0],\ if\\&\quad row>maxRow,col<0,//lower\ left\ Block\\&\quad [maxRow][maxCol],\ if\ row>maxRow,\\&\quad col>maxCol,//lower\ right\ Block[0][col],\ if\\&\quad row\le0,col\ge0,col\le maxCol,//top\ Block[row]\\&\quad [maxCol],\ if\ row\ge0,row\le maxRow,\\&\quad col>maxRow,//right\ Block[maxRow][col],\ if\\&\quad row>maxRow,col\ge0,col\le maxCol,//bottom\ Block\\&\quad [row][0],\ if\ row\ge0,row\le maxRow,col<0.//left\qquad (Eq.\ 5)\end{aligned}$$

A size of an obtained image and a size of the original image are the same according to the above method.

2. Direction Partitioning

Figure 2:
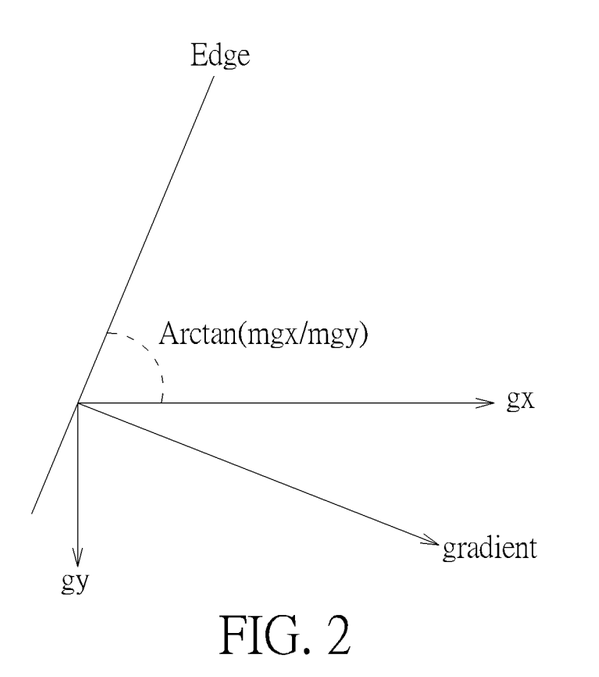
FIG. 2 is a schematic diagram of a relation between an edge and a gradient according to an example of the present invention.

FIG. 2 is a schematic diagram of a relation between an edge and a gradient according to an example of the present invention. FIG. 2 describes a relation between an edge and a gradient. A direction of the gradient is determined according to gx and gy, i.e., according to Arctan(mgx/mgy), where mgx and mgy are magnitudes of gx and gy, respectively. Since the direction of the gradient is perpendicular to the edge, information of the edge can be determined according to gx and gy. According to the direction partitioning, statistical information of HOG values of the 33 angular modes can be computed, e.g., by the HOG module 100. For each pixel, a direction of an edge is calculated according to gx and gy. Statistical information of the HOG value nearest to the direction is increased by (mgx+mgy).

3. Intra Mode Selection

According to the HOG obtained above, the HOG module 100 selects the 4 angular modes with the most statistical information. Then, the 4 angular modes, the DC mode and the planar mode are provided to the decision module 110. These 6 modes can be seen as results of a primary selection.

Figure 3:
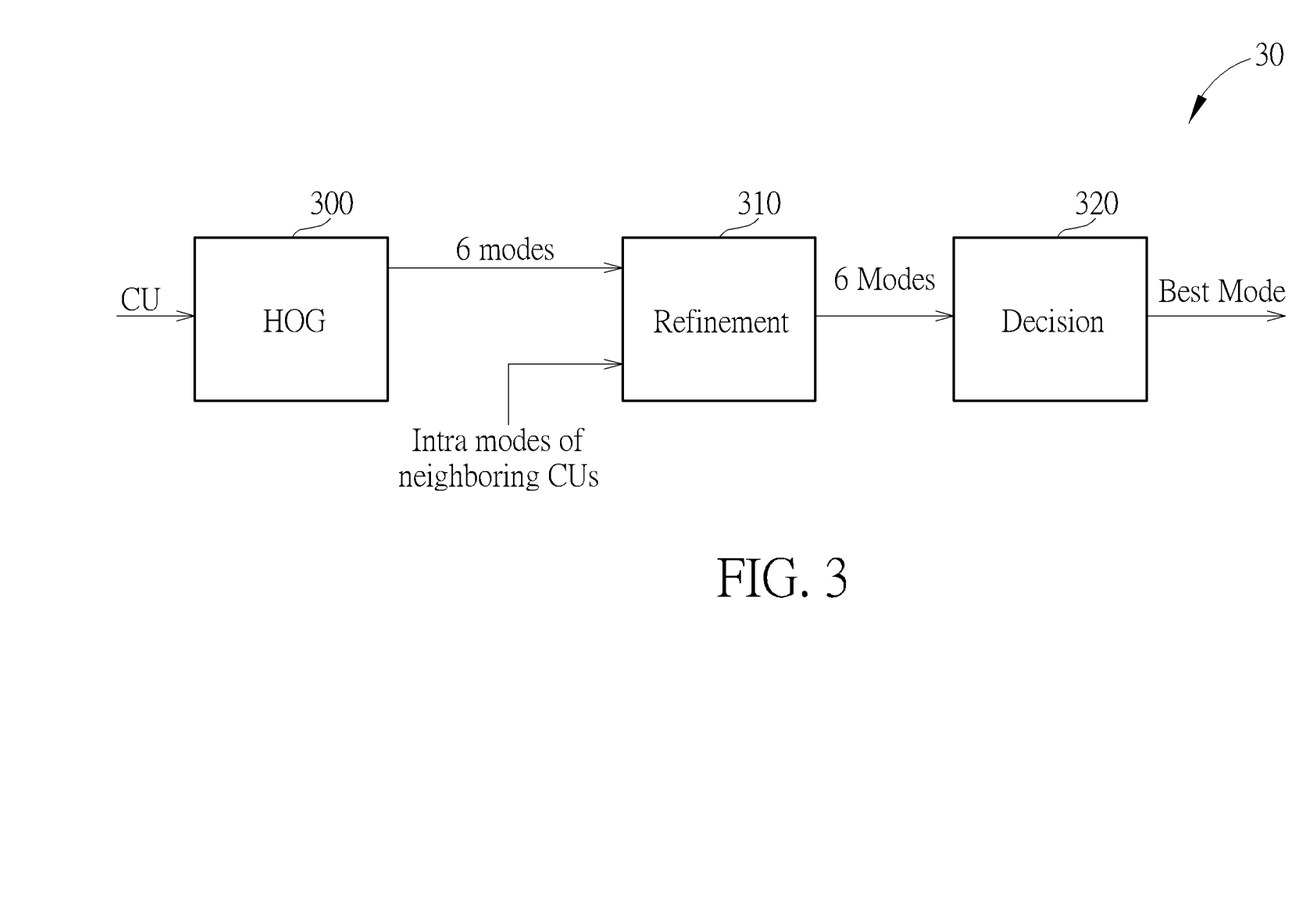
FIG. 3 is a schematic diagram of a refined selection module according to an example of the present invention.

FIG. 3 is a schematic diagram of a refined selection module 30 according to an example of the present invention. The refined selection module 30 includes a HOG module 300, a refinement module 310 and a decision module 320. There are various realizations of the HOG module 300, the refinement module 310 and the decision module 320. Example of operations of the HOG module 300, the refinement module 310 and the decision module 320 are described in the following paragraphs.

(i) Operation of the HOG Module 300

The HOG module 300 selects 4 angular modes from 33 angular modes of the CU, a DC mode of the CU and a planar mode of the CU, after receiving the CU. These 6 modes are provided to the refinement module 310.

(ii) Operation of the Refinement Module 310

The refinement module 310 further obtains (e.g., receives) intra modes of neighboring CUs of the CU. The intra modes of the neighboring CUs may be previously determined. A neighboring CU may locate on left or top of the CU, if the neighboring CU exists. Thus, the refinement module 310 obtains the 6 modes from the HOG module 300 and the intra modes of neighboring CUs. The refinement module 310 refines the obtained modes according to the following steps. The refinement module 310 compares the 6 modes (i.e., the 4 angular modes, a DC mode of the CU and a planar mode of the CU) with the intra modes of the neighboring CUs of the CU. For one of the neighboring CUs, the refinement module 310 replaces one of the 6 modes from the HOG module 300 with the least statistical information by the intra mode of the one of the neighboring CUs, if the intra mode of the one of the neighboring CUs is not one of the 6 modes. The refinement module 310 performs the above operation on all of the intra modes of the neighboring CUs, and an intra mode list including 6 refined modes is obtained. That is, the refinement module 310 may replace a set of the 6 modes by a set of the intra modes of the neighboring CUs according to statistical information of the six modes (and whether an intra mode of the CU is the same as an intra mode of the neighboring CUs).

(iii) Operation of the Decision Module 320

The decision module 320 computes rate distortions (or rate distortion costs) of the 6 refined modes according to a SSATD algorithm, to selects a best mode with the smallest rate distortion. In addition, both reconstructed pixels and original pixels are used as (i.e., included in or belong to) reference pixels, to reduce implementation complexity of the decision module 320.

Figure 4:
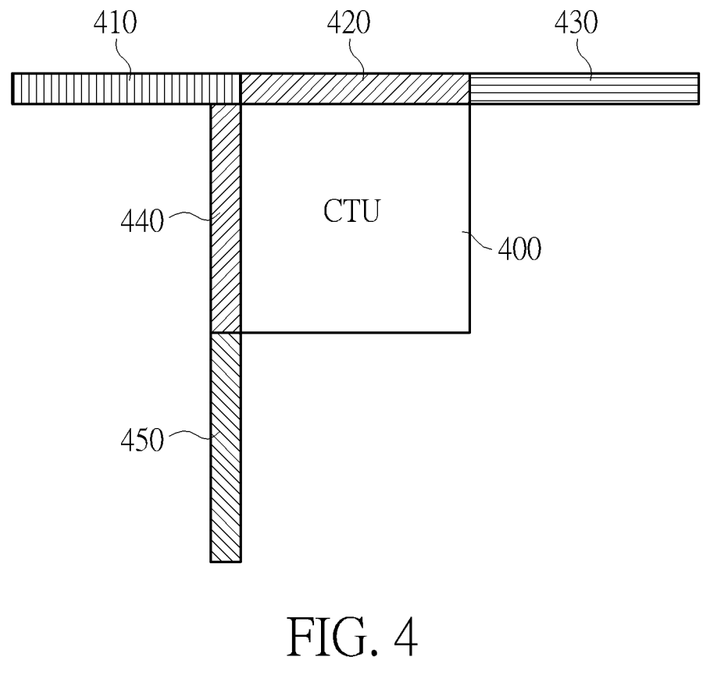
FIG. 4 is a schematic diagram of reference pixels according to an example of the present invention.

FIG. 4 is a schematic diagram of reference pixels according to an example of the present invention. In the present example, whether a reconstructed pixel or an original pixel is used as a reference pixel of a CU of a coding tree unit (CTU) 400 is determined according to a location of the reference pixel, e.g., whether the reference pixel locates in the CTU 400. If reference pixels do not locate in the CTU 400, reconstructed pixels are used as the reference pixels locating in an upper left region 410, a top region 420 and an upper right region 430, and original pixels are used as the reference pixels locating in a left region 440 and a lower left region 450. If reference pixels locate in the CTU 400, original pixels are used as the reference pixels.

4. Dividing the CU

A CU may be further divided into CUs with smaller sizes. In one example, a CU with a size of 32×32 is divided into 16 CUs with a size of 8×8. Then, a SSATD result of the CU with the size of 8×8 is a sum of SSATD results of the 16 CUs with the size of 8×8.

Whether a CU should be divided into CUs with a smaller size may be determined according to (e.g., by comparing) a rate distortion of the CU and a sum of rate distortions of the CUs with the smaller size. In one example, the CU is divided into CUs with a smaller size of A, if a rate distortion of the CU is greater than a sum of rate distortions of the CUs with the size of A. The rate distortion or the sum of the rate distortions is obtained as the rate distortion of the best mode mentioned above.

When the CUs with the smaller size are used instead of the CU, an offset should be applied to the CUs to improve the accuracy. The offset may be determined according to a lookup table.

Figure 5:
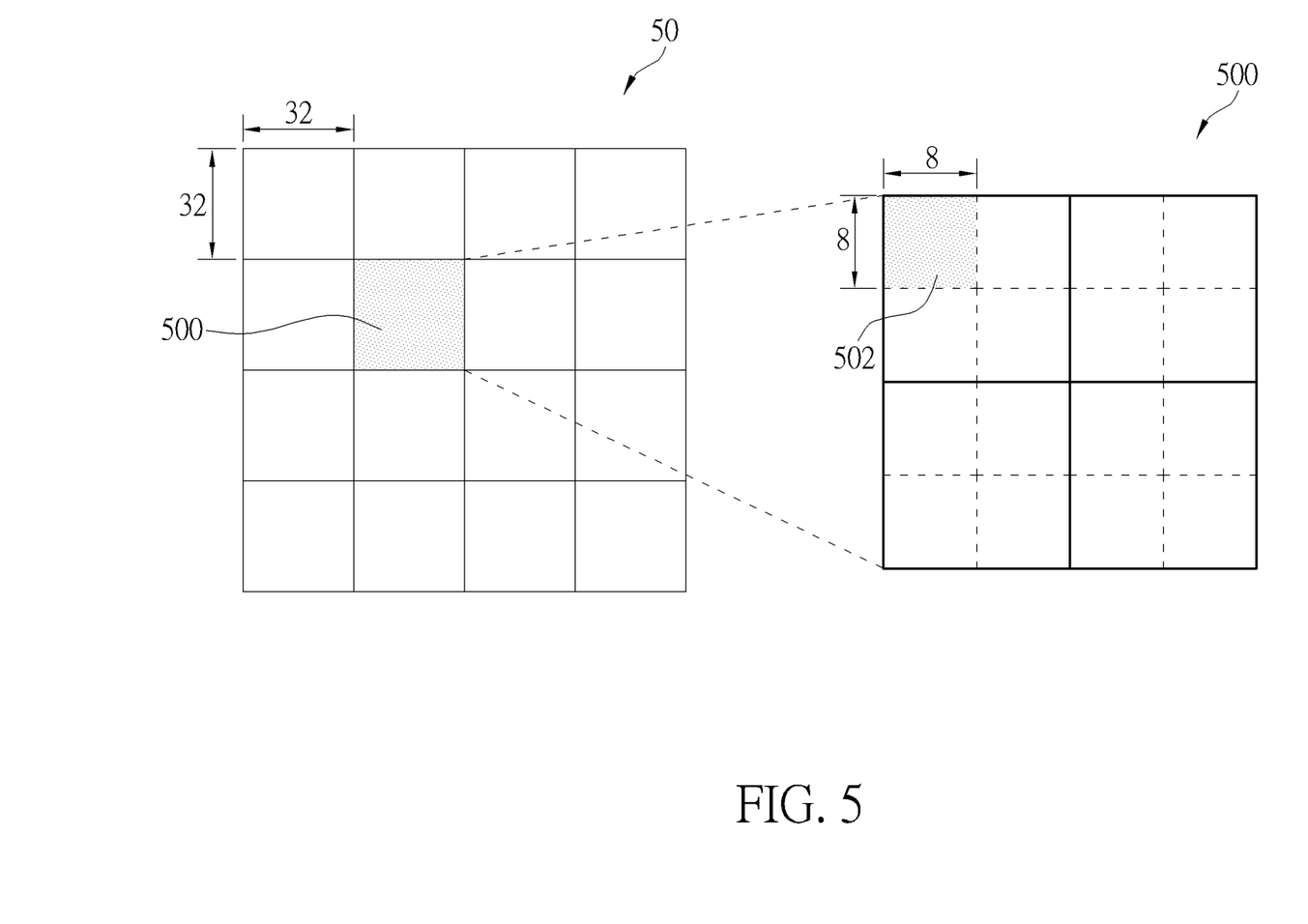
FIG. 5 is a schematic diagram of an image according to an example of the present invention.

FIG. 5 is a schematic diagram of an image 50 according to an example of the present invention. The image 50 is divided into 16 CTUs with a size of 32×32. A CTU 500 is selected in the present example. There are various ways of dividing the CTU 500. The CTU 500 may be divided into 4 CUs with a size of 16×16, and a CU with the size of 16×16 may be further divided into 4 CUs with a size of 8×8. A CU 502 with the size 8×8 is used in the following examples, to illustrate how an intra mode is selected.

(i) Computing Gradient

In general, a unit of computing a gradient is a CTU with a size of 32×32. The gradient of the CTU can be reused for a gradient of a CU with a size of 8×8.

Figure 6:
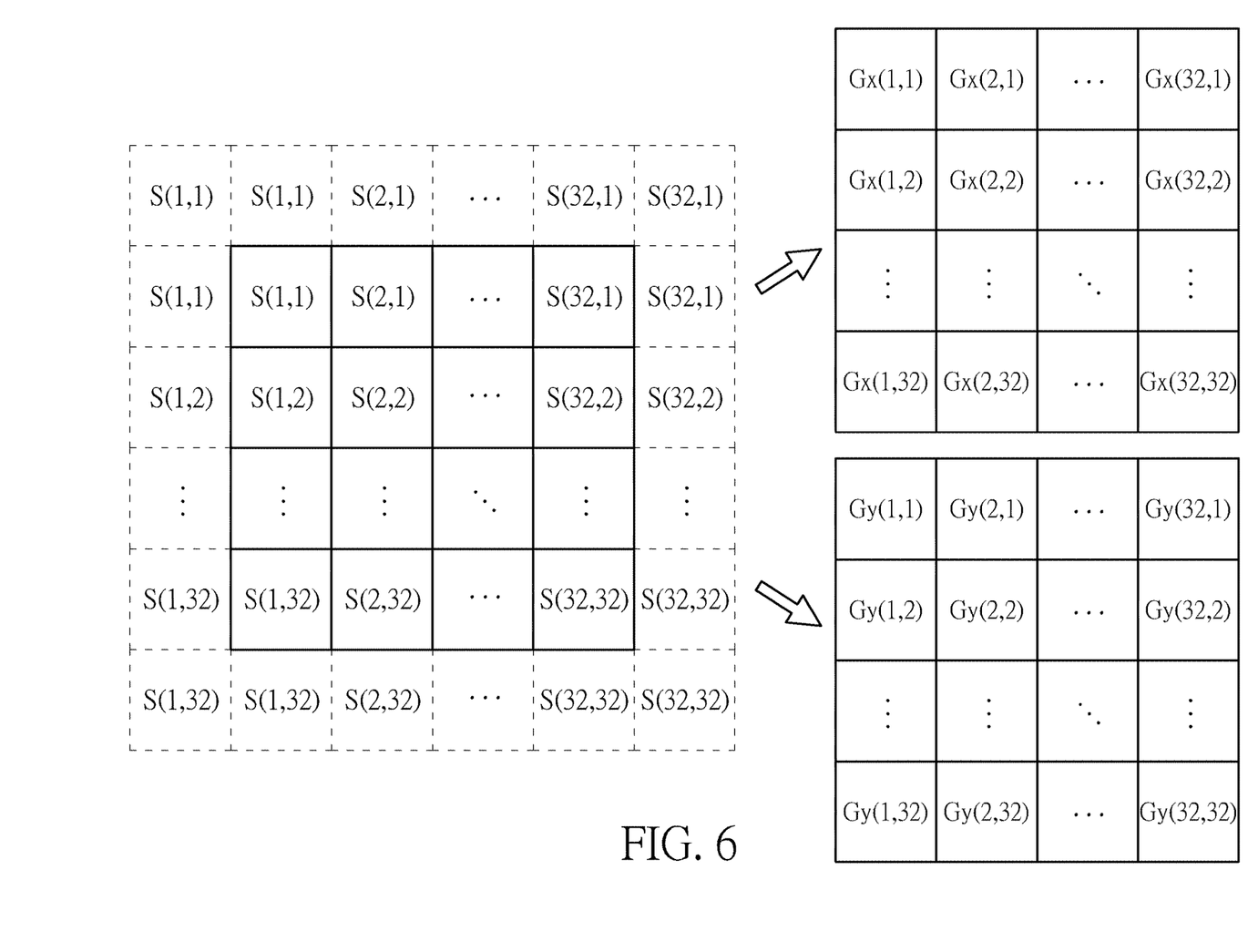
FIG. 6 is a schematic diagram of gradient computation according to an example of the present invention.

FIG. 6 is a schematic diagram of gradient computation according to an example of the present invention. When computing a gradient of a pixel, values of an upper pixel, a lower pixel, a left pixel and a right pixel are needed. If the pixel locates at an edge of a CTU, pixels should be extended. For example, squares depicted by dotted lines in FIG. 6 are extended pixels, and are obtained by duplicating neighbor pixels. Taking a pixel S(1,1) as an example, 8 neighboring pixels of the pixel S(1,1) are needed for computing gradients at a X direction and a Y direction of the pixel S(1,1). The gradients are computed as follows:

$$Gx(1,1)=(-1)*S(1,1)+0*S(1,1)+(1)*S(2,1)+(-2)*S(1,1)+0*S(1,1)+(2)*S(2,1)+(-1)*S(1,2)+0*S(1,2)+(1)*S(2,2),$$ (Eq. 6)

$$Gy(1,1)=(-1)*S(1,1)+(-2)*S(1,1)+(-1)*S(2,1)+0*S(1,1)+0*S(1,1)+0*S(2,1)+(1)*S(1,2)+(2)*S(1,2)+(1)*S(2,2),$$ (Eq. 7)

where Gx(1,1) and Gy(1,1) are the gradients of the pixel S(1,1) at the X direction and the Y direction, respectively.

Figure 8:
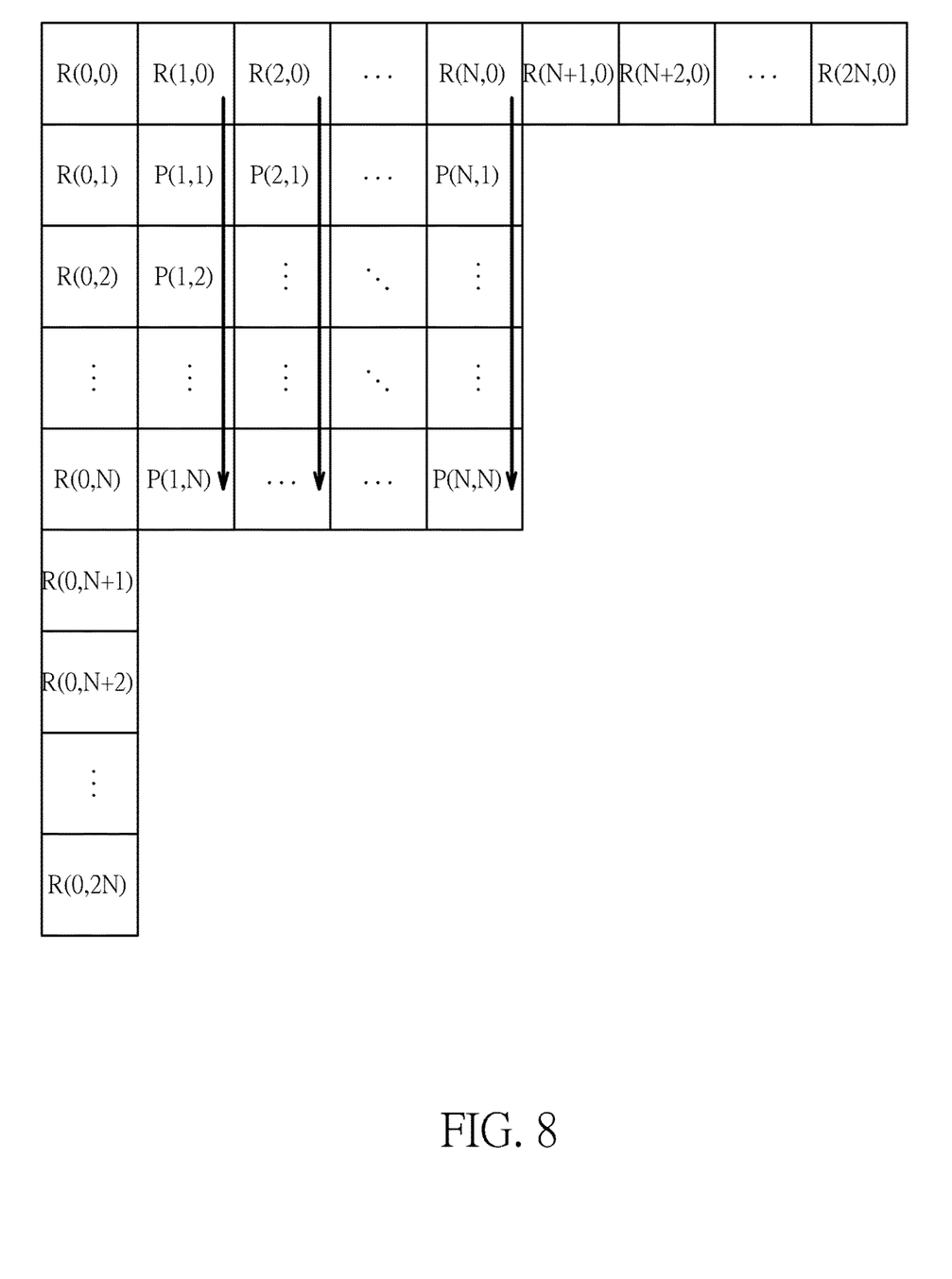
FIG. 8 is a schematic diagram of predictions of pixels according to an example of the present invention.

According to the above equations, gradients of all 32×32 in the CTU (e.g., the CTU 500) at the X direction and the Y direction can be similarly obtained. The schematics diagrams of the gradients are Gx(1, 1), . . . , Gx(32,32) and Gy(1, 1), . . . , Gy(32,32) corresponding to S(1,1), . . . , S(32,32), and are shown in FIG. 8.

(ii) Direction Partitioning

Figure 7:
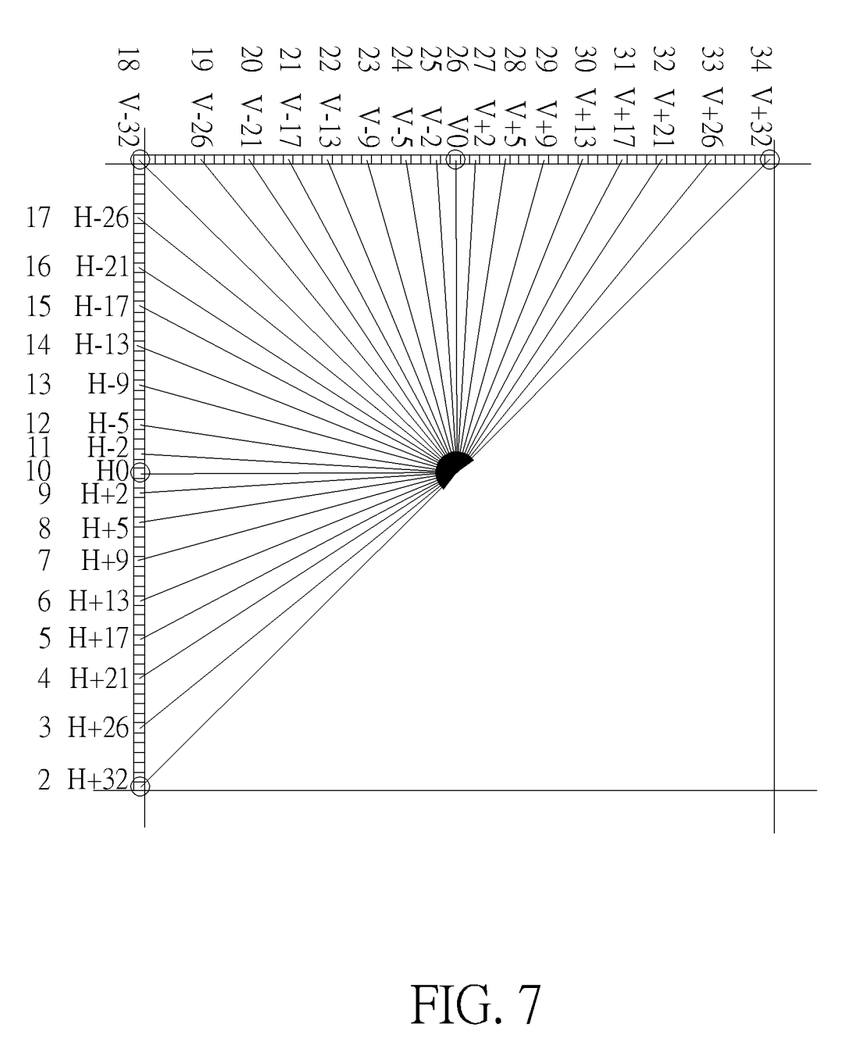
FIG. 7 is a schematic diagram of angular modes according to an example of the present invention.

FIG. 7 is a schematic diagram of angular modes according to an example of the present invention. FIG. 7 shows 33 angular modes in the HEVC standard. Circles indicate diagonal directions, a horizontal direction and a vertical direction.

A CU with a size of 8×8 includes 64 pixels, where each pixel includes gradients at a X direction and a Y direction. An edge direction of a pixel can be obtained according to gradients of the pixel at the X direction and the Y direction. The calculated edge is classified to the nearest direction of the above mentioned 33 angular modes' directions. The sum of the gx's and gy's absolute values indicates the magnitude of the chosen nearest angular modes.

Angular modes 26-34 are considered in the following example. Assuming that gradients (gx,gy)=(−16,−9) of a pixel of a CU are obtained. The following operations are performed.

(a) Angular intervals are predetermined as [29, 23.5, 19, 15, 11, 8, 5, 4].

(b) A direction is determined to be lower left according to signs of the gradients. Thus, it can be obtained that an angular range locates between the angular mode 26 the angular mode 34.

(c) The gradients are scaled to guarantee that abs(gx)=32, and a scaled result is (gx',gy')=(−32,−18).

(d) A corresponding angular 31(V+17) is obtained, since abs(gy')=18 which locates between the angular intervals 19 and 15.

(e) According to the above results, a HOG value of the angular mode 31 is added by abs(gx)+abs(gy).

(f) The above operations are performed on all pixels of the CU to obtain HOG values, and the HOG values are sorted from large to small. The first four angular modes are candidate angular modes.

(iii) Intra Mode Selection

Rate distortions of the candidate angular modes are computed. The candidate angular mode with the smallest rate distortion is selected as the best angular mode.

The rate distortion can be obtained according to the following equation:

$$RD\_Cost=D+lambda*R,$$ (Eq. 8)

where lambda is a constant determined according to a quantization parameter (QP) of an encoding of a pixel, R is the number of bits occupied in a bit stream in a mode of the encoding, and D is a difference between an original value and a predicted value of the pixel, which is calculated according to the SSATD algorithm.

FIG. 8 is a schematic diagram of predictions of pixels according to an example of the present invention. Pixels P(x,y), x=1, . . . , N, y=1, . . . , N are predicted according to pixels R(x,y), x=0, . . . , N, y=0, . . . , N. The pixels R(x,y) include a left region, a top region, a top right region and an upper left region which include original pixels and reconstructed pixels. Each angular mode is configured with a corresponding set of equations. For example, the angular mode 26 is configured with the following set of equations:

$$P(1,1)=P(1,2)= \ldots =P(1,N)=R(1,0),$$

$$P(2,1)=P(2,2)= \ldots =P(2,N)=R(2,0),$$

$$P(N,1)=P(N,2)= \ldots =P(N,N)=R(N,0).$$ (Eq. 9)

A difference between an original pixels and predicted pixels is calculated according to the SSATD algorithm, after the predicted pixels of the angular mode 26 are obtained.

Figure 9:
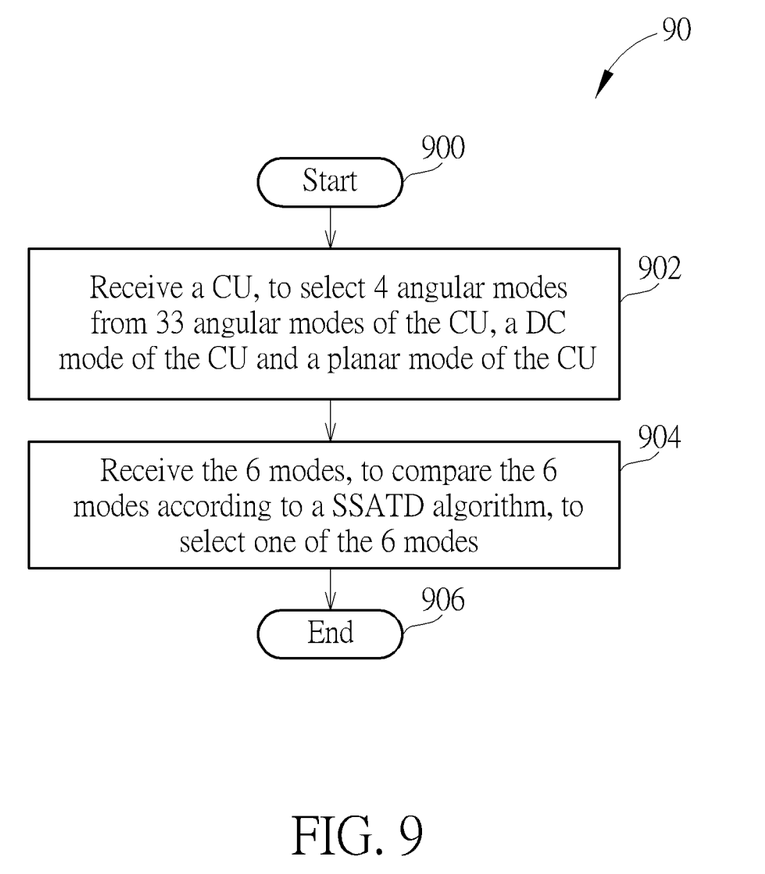
FIG. 9 is a flowchart of a process according to an example of the present invention.

Operations of the selecting module 10 or the refined selection module 30 in the above examples can be summarized into a process 90 shown in FIG. 9. The process 90 includes the following steps:

Step 900: Start.

Step 902: Receive a CU, to select 4 angular modes from 33 angular modes of the CU, a DC mode of the CU and a planar mode of the CU.

Step 904: Receive the 6 modes, to compare the 6 modes according to a SSATD algorithm, to select one of the 6 modes.

Step 906: End.

The process 90 is used for illustrating the operations of the selecting module 10 or the refined selection module 30. Detailed description and variations of the process 90 can be referred to the previous description, and are not narrated herein.

Those skilled in the art should readily make combinations, modifications and/or alterations on the abovementioned description and examples. The abovementioned description, steps, functions, modules and/or processes including suggested steps can be realized by means that could be hardware, software, firmware (known as a combination of a hardware device and computer instructions and data that reside as read-only software on the hardware device), an electronic system, or combination thereof.

Examples of the hardware may include analog circuit(s), digital circuit (s) and/or mixed circuit (s). For example, the hardware may include application-specific integrated circuit(s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a device and method for selecting an intra mode. Parallel processing of hardware can be realized, and computation complexity of the hardware is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A selection module for selecting an intra mode, comprising:
 a histogram of oriented gradient (HOG) module, for receiving a coding unit (CU), to select four angular modes from 33 angular modes of the CU, a DC mode of the CU and a planar mode of the CU; and
 a decision module, couple to the HOG module, for receiving the six modes from the HOG module, to compare the six modes according to a Split Sum of Absolute Transformed Difference (SSATD) algorithm, to select one of the six modes;
 wherein the decision module compares the six modes, to select the one of the six modes according to the following steps:
  computing rate distortions of the six modes according to a plurality of reference pixels comprising a plurality of originals pixels of the CU and a plurality of reconstructed pixels of the CU; and
  selecting the one of the six modes with a smallest rate distortion of the rate distortions.

2. The selection module of claim 1, wherein the HOG module selects the four angular modes, the DC mode and the planar mode according to the following steps:
 computing a plurality of gradients of the CU;
 computing statistical information of the 33 angular modes according to the plurality of gradients; and
 selecting the four angular modes according to the statistical information.

3. The selection module of claim 2, wherein the HOG module computes the plurality of gradients of the CU according to a Sobel operator.

4. The selection module of claim 1, wherein the selection module further comprises:
 a refinement module, coupled between the HOG module and the decision module, for refining the six modes according to the following steps:
 receiving the six modes from the HOG module;
 obtaining a plurality of intra modes of a plurality of neighboring CUs of the CU;
 comparing the six modes with the plurality of intra modes of the plurality of neighboring CUs; and
 replacing a set of the six modes by a set of the plurality of intra modes according to statistical information of the six modes.

5. The selection module of claim 1, wherein the plurality of reconstructed pixels are comprised in the plurality of reference pixels according to a plurality of locations of the plurality of reference pixels.

6. The selection module of claim 1, wherein a size of the CU is determined according to a rate distortion of the CU and a sum of rate distortions of a plurality of CUs divided from the CU.

7. The selection module of claim 1, wherein the 33 angular modes belong to a luma component of the CU.

8. A method for selecting an intra mode, comprising:
 receiving a coding unit (CU), to select four angular modes from 33 angular modes of the CU, a DC mode of the CU and a planar mode of the CU; and
 receiving the six modes, to compare the six modes according to a Split Sum of Absolute Transformed Difference (SSATD) algorithm, to select one of the six modes;
 wherein the step of comparing the six modes, to select the one of the six modes comprises:
  computing rate distortions of the six modes according to a plurality of reference pixels comprising a plurality of originals pixels of the CU and a plurality of reconstructed pixels of the CU; and
  selecting the one of the six modes with a smallest rate distortion of the rate distortions.

9. The method of claim 8, wherein the step of selecting the four angular modes, the DC mode and the planar mode comprises:
 computing a plurality of gradients of the CU;
 computing statistical information of the 33 angular modes according to the plurality of gradients; and
 selecting the four angular modes according to the statistical information.

10. The method of claim 9, further comprising:
computing the plurality of gradients of the CU according to a Sobel operator.

11. The method of claim 8, further comprising:
receiving the six modes;
obtaining a plurality of intra modes of a plurality of neighboring CUs of the CU;
comparing the six modes with the plurality of intra modes of the plurality of neighboring CUs; and
replacing a set of the six modes by a set of the plurality of intra modes according to statistical information of the six modes.

12. The method of claim 8, wherein the plurality of reconstructed pixels are comprised in the plurality of reference pixels according to a plurality of locations of the plurality of reference pixels.

13. The method of claim 8, wherein a size of the CU is determined according to a rate distortion of the CU and a sum of rate distortions of a plurality of CUs divided from the CU.

14. The method of claim 8, wherein the 33 angular modes belong to a luma component of the CU.

* * * * *